Patented Dec. 23, 1947

2,433,276

UNITED STATES PATENT OFFICE 2,433,276

ICE CREAM AND ICE CREAM MIX

Irene Breyer Hipple, Haverford, and Samuel S. Sadtler, Whitemarsh, Pa.

No Drawing. Application November 17, 1943, Serial No. 510,832

8 Claims. (Cl. 99—136)

This invention relates to ice cream and ice cream mixes or concentrates and to the processes by which they are formed.

It is among the objects of this invention; to provide an ice cream mix with a relatively small amount of milk fats while having a taste in the final mixture as of ice cream of a much higher milk fat content; to provide an ice cream mix of economy of production and which is healthful to the user; to provide an ice cream mix which is pleasing to the taste in its own right and which is free from the parched taste of other efforts to produce an ice cream mix; to provide an ice cream mix using food proteins with an enhancement of flavor and nutrition factors; to provide an ice cream mix including hydrogenated milk or butter fat; to provide an ice cream mix of enhanced nourishing qualities through decrease in actual butter or milk fat content while maintaining a taste simulating an actual high fat content; to provide an ice cream mix of very low water content; and other objects and advantages of our invention will become more evident as the description proceeds.

While our process is based on an ice cream of formulation ready for use, we lay rather more stress on the making of concentrates that are to be diluted with whole or skimmed milk or water for purposes of economy in shipping, etc.

Our invention, in brief, is to increase the effective proportion of protein to fat in the protein-fat ratio without detracting from the desirable full fat taste of ice cream. We do this by decreasing the unsaturated fatty acids in the natural glycerides of the cream or butter used and by adding food proteins other than milk to improve the digestibility and flavor. We hydrogenate part of the milk fat which is best done by hydrogenating butter oil from fresh sweet butter and use this with cream or cream-milk mixtures, along with the other ingredients of ice cream, such as sugar, flavor stabilizers, etc. As the method for the hydrogenation of fats, such as butter fat, is so well known in the art, we will not describe the hydrogenation process.

It is necessary to agitate the cream and hydrogenated butter fat, slightly warmed, so as to insure the butter fat being in a liquid form and then to homogenize the mixture so as to insure an extreme dispersion of the hydrogenated butter fat in the cream. It is also desirable to have the stabilizing constituents, such as skimmed milk solids, other proteins, gelatin, and calcium sucrate present to aid in the dispersion and as protecting agents or at least have a substantial part of these ingredients present at the time of mixing and homogenizing.

Hydrogenating milk fat tends to give a fuller fat taste so that less fat can be used without lessening the effect on the palate. Hydrogenation also adds to the keeping qualities by lessening unsaturation of the fatty acids and at the same time lessening the buttery taste when butter fat is used as well as cream.

By increasing the fullness of the milk fat, we find more protein may be used, either milk proteins or other food proteins or mixtures of these proteins. We prefer to use part milk proteins and part purified soya or corn (maize) proteins. We find soya proteins, for instance, give an added smoothness and delicate flavor when used in ice cream.

With the use of butter oil hydrogenated to from one-half to two-thirds of saturation to supply fifty per cent of the total fat and using about as much soya proteins as milk proteins, we find that an ice cream with 10.5% fat will have the satisfying taste of one containing about 14% total fat. A superior product can be made in this way with greater digestibility as fat assimilation can easily be over-taxed in the human digestion.

I

An example of a moderate fat-content ice cream with superior qualities according to our invention is as follows:

| | Per cent |
|---|---|
| Butter oil hydrogenated about 60% of saturation | 5.5 |
| Cream (15% fat) | 20.0 |
| Milk (3.8% fat) | 50.0 |
| Skimmed milk powder | 3.0 |
| Soya proteins | 3.0 |
| Sugar | 14.5 |
| Gelatin | 0.5 |
| Calcium sucrate | 0.5 |
| Water | 3.0 |
| | 100.0 |

This should have an over-run of about 90% and should be very full, rich and satisfying. The mixture should be homogenized at a temperature sufficient to liquify the hydrogenated butter fat.

II

As an example of a concentrate of fairly thick consistency according to our process:

| | Per cent |
|---|---|
| Butter oil (50% hydrogenated) | 21.25 |
| Cream (40% fat) | 25.00 |
| Milk solids non fat | 14.00 |
| Soya proteins | 8.00 |
| Sugar | 24.50 |
| Gelatin | 1.75 |
| Calcium sucrate | 0.50 |
| Water | 5.00 |
| | 100.00 |

This may be diluted with two parts of milk to make a high class ice cream of about 10% fat content which will taste richer and fuller than ordinary ice cream of 10% milk fat.

The mixture, preferably before adding the sugar, should be homogenized.

III

Milk and cream may be dehydrated by spraying into a heated chamber. Cream is thus powdered to approximately 50% fat. We add liquified hydrogenated butter fat, soya proteins, and gelatin to cream before spray-powdering and then add sugar, such as confectioners XXXX, and flavor to suit. This produces a concentrate that is discrete at ordinary temperatures and should be vacuum packed. The formula would be about as follows:

| | Per cent |
|---|---|
| Hydrogenated butter fat (50% hydrogenated) | 20.0 |
| Dried cream with 50% fat | 25.0 |
| Skimmed milk powder | 17.0 |
| Soya proteins | 10.0 |
| Sugar | 25.0 |
| Gelatin | 2.0 |
| Flavor, calcium sucrate, etc. | 1.0 |
| | 100.0 |

This product contains about 33% fat and may be diluted with about three parts of high grade milk, roughly three pints of "A" milk to a pound of concentrate. The above examples are only meant to be approximated as to proportions. Calcium sucrate is used in small amounts to be determined by experience. This is to prevent acidity, especially from the influence of added proteins such as soya proteins or zein from corn. This adds to the stabilizing effect of milk proteins and gelatin. Gelatin may be omitted if calcium sucrate is used. Skimmed milk powder may substitute for all or part of the soya proteins but we prefer to use soya proteins.

Other hydrogenated food fats, such as soya oil, corn oil, or cotton seed oil may be used instead of butter oil but we prefer to use hydrogenated butter oil.

Having thus described our invention, we claim:

1. A substantially powder-like ice cream mix comprised of a substantially homogeneous powdered mass of dry discrete particles of hydrogenated butter fat, cream and soya proteins.

2. A substantially powder-like ice cream mix comprised of a substantially homogeneous powdered mass of dry discrete particles of hydrogenated butter fat, cream, soya proteins, and gelatin.

3. A substantially powder-like ice cream mix comprised of a substantially homogeneous powdered mass of dry discrete particles of hydrogenated butter fat, cream, and skimmed milk powder.

4. A substantially powder-like ice cream mix comprised of a substantially homogeneous powdered mass of dry discrete particles of hydrogenated butter fat, cream, skimmed milk powder, and calcium sucrate.

5. The process of making ice cream mix comprising the steps of mixing hydrogenated butter fat, cream, and soya proteins, and spray drying the mixture to form a mass of dry discrete particles of good storage properties and of excellent taste in an ultimate ice cream.

6. The process of making ice cream mix comprising the steps of mixing hydrogenated butter fat, cream, soya proteins and gelatine, and spray drying the mixture to form a mass of dry discrete particles of good storage properties and excellent taste in an ultimate ice cream.

7. The process of making ice cream mix comprising the steps of mixing hydrogenated butter fat, cream, and skimmed milk powder, and spray drying the mixture to form a mass of dry discrete particles of good storage properties and excellent taste in an ultimate ice cream.

8. The process of making ice cream mix comprising the steps of mixing hydrogenated butter fat, cream, skimmed milk powder and calcium sucrate, and spray drying the mixture to form a mass of dry discrete particles of good storage properties and excellent taste in an ultimate ice cream.

IRENE BREYER HIPPLE.
SAMUEL S. SADTLER.

REFERENCES CITED

The following references are of record in the file of this patent:

UNITED STATES PATENTS

| Number | Name | Date |
|---|---|---|
| 2,253,389 | Mnookin | Aug. 19, 1941 |
| 2,272,578 | Penn | Feb. 10, 1942 |

FOREIGN PATENTS

| Number | Country | Date |
|---|---|---|
| 309,417 | Great Britain | Apr. 8, 1929 |
| 518,925 | Great Britain | Mar. 12, 1940 |
| 528,397 | Great Britain | Oct. 29, 1940 |

OTHER REFERENCES

L. T. Hynes, "Ice Cream Manufacture in 1941," vol. XVI, No. 3, of Food Manufacture, March 1, 1941, pages 60 and 61. (Copy in Div. 63.)